United States Patent [19]

Brown et al.

[11] Patent Number: 5,450,073
[45] Date of Patent: Sep. 12, 1995

[54] CONTROLLING POWER SEQUENCING OF A CONTROL UNIT IN AN INPUT/OUTPUT SYSTEM

[75] Inventors: Paul J. Brown, Poughkeepsie; Joseph C. Elliott, Hopwell Junction; Bernhard Laubli, Endicott; Kenneth R. Lynch, Rhinebeck, all of N.Y.; William F. Micka, Tucson, Ariz.

[73] Assignee: International Business Machines Corporation, Armonk, N.Y.

[21] Appl. No.: 178,489

[22] Filed: Jan. 6, 1994

Related U.S. Application Data

[63] Continuation of Ser. No. 816,438, Dec. 31, 1991, abandoned.

[51] Int. Cl.⁶ .............................................. H04Q 1/00
[52] U.S. Cl. ................................. 340/825.07; 307/40; 307/114; 340/313
[58] Field of Search ............. 340/825.07, 825.22, 340/825.34, 825.50, 313, 333; 307/35, 38, 40, 112, 114

[56] References Cited

U.S. PATENT DOCUMENTS

| | | |
|---|---|---|
| 4,074,142 | 2/1978 | Jackson . |
| 4,204,249 | 5/1980 | Dye ............................. 307/64 |
| 4,312,035 | 1/1982 | Greene ..................... 340/825.22 |
| 4,357,665 | 11/1982 | Korff ............................ 307/35 |
| 4,562,533 | 12/1985 | Hodel et al. . |
| 4,605,928 | 8/1986 | Georgiou . |
| 4,608,661 | 8/1986 | Sasaki ........................... 371/14 |
| 4,630,045 | 12/1986 | Georgiou . |
| 4,635,250 | 1/1987 | Georgiou . |
| 4,641,302 | 2/1987 | Miller . |
| 4,692,917 | 9/1987 | Fujioka . |
| 4,703,487 | 10/1987 | Haselton et al. . |
| 4,747,041 | 5/1988 | Engel ....................... 340/825.22 |
| 4,771,419 | 9/1988 | Graves et al. . |
| 4,807,052 | 2/1989 | Amano ..................... 340/825.22 |

OTHER PUBLICATIONS

IBM Technical Disclosure Bulletin vol. 27, No. 8, Jan. 1985, pp. 4690–4692 "Parallel Interface Switching Mechanism" by Georgiou.

Primary Examiner—Donald J. Yusko
Assistant Examiner—Brian Zimmerman
Attorney, Agent, or Firm—Lynn L. Augspurger; Laurence J. Marhoefer

[57] ABSTRACT

A mechanism for controlling the powering-on and powering-off of control units in a data processing system having a plurality of channels, a plurality of control units, and a communications network of links for linking the channels to the control units. Each control unit includes a power-control table for recording power-control allegiance of the control unit to the channels. Where a control unit receives a power-on command from a channel, it records the identity of the channel in its power-control table. When a channel orders a control unit to power-off, the control unit checks to see if it owes power-control allegiance to the ordering channel. If it does, the control unit deletes the identity from its power-control table. The control unit will not power-off unless its power-control table is empty, indicating that it does not owe allegiance to any other channel.

11 Claims, 9 Drawing Sheets

CONTROLLING POWER SEQUENCING OF A CONTROL UNIT IN AN INPUT/OUTPUT SYSTEM

CROSS-REFERENCE TO RELATED APPLICATION

This application is a continuation of application Ser. No. 07/816,438, filed Dec. 31, 1991, now abandoned.

BACKGROUND OF THE INVENTION

The present invention is related to a data processing system having input/output channels, control units each for controlling peripheral devices, and a dynamic switch between the channels and the control units, and is more particularly related to controlling the power sequencing of a control unit, either under local control or under remote control, by a channel through the dynamic switch.

Various switches such as cross-point switches are known for establishing connections between data lines. Such switches are useful in establishing point-to-point connections between an input/output (I/O) channel of a data processing system and an I/O peripheral device or control unit.

Georgiou, Parallel Interface Switching Mechanism, pp 4690–4692, IBM Technical Disclosure Bulletin, Vol. 27, No. 8, January, 1985, discloses utilizing high-speed cross-point switching chips in multiple parallel interface switching mechanisms. A controller is referred to but not shown which is used to set up connections on the switching chips in order to establish paths between channels and control units.

U.S. Pat. No. 4,074,142 to Jackson for Optical Cross-Point Switch issued Feb. 14, 1978 and discloses an optical cross-point switch for connecting any of a multiplicity of input signals to any of a multiplicity of output lines. Electrical signals are converted to optical signals by light emitting diodes. The light from each light emitting diode is focused on photosensor means to convert the optical signals back to electrical signals. An input and output address decoding circuit selects one light emitting diode to be coupled to one photosensor to make a switch connection. The address information is transmitted to the optical switch via an address bus.

U.S. Pat. No. 4,562,533 to Hodel et al. for Data Communications System to System Adapter issued Dec. 31, 1985 and discloses a data processing system having a dynamic channel exchange and a plurality of central systems. Each of the central systems has at least one serial channel control processor. The dynamic channel exchange provides switching logic for permitting each of the plurality of central systems access to a plurality of peripherals coupled to the dynamic channel exchange. The data processing system further includes an adapter which is connected to the dynamic channel exchange for providing communications between any pair of central systems.

U.S. Pat. No. 4,605,928 to Georgiou for Fault-Tolerant Array of Cross-Point Switching Matrices issued Aug. 12, 1986 and discloses a cross-point switch in which it is possible to have bi-directional operation for allowing data flow in both directions.

U.S. Pat. No. 4,630,045 to Georgiou for Controller for a Cross-Point Switching Matrix issued Dec. 16, 1986 and discloses a switching matrix controller which interprets a request for connection or disconnection, determines if it is possible, selects a path through the matrix and sends control signals to the matrix to make the connection or disconnection. The status of the switching array is checked when making the connection or disconnection.

U.S. Pat. No. 4,635,250 to Georgiou for Full-Duplex One-Sided Cross-Point Switch issued Jan. 6, 1987 and discloses a one-sided cross-point switching chip which may be operated in a full duplex mode wherein the direction of information flow or electrical signals on the internal vertical lines or the interconnection lines can be in different directions, depending upon which external lines are to be interconnected.

U.S. Pat. No. 4,641,302 to Miller for High Speed Packet Switching Arrangement issued Feb. 3, 1987 and discloses a circuit arrangement for switching serial data packets through a network to one of a plurality of possible outgoing lines. The incoming serial data is in packets wherein each packet includes a header portion containing an address indicative of which one of a plurality of outgoing lines the data packet should be routed to.

U.S. Pat. No. 4,692,917 to Fujioka for Packet Switching System issued Sep. 8, 1987 and discloses a packet switching system having a packet handler for analyzing a header of each incoming packet and deciding the outgoing route of the packet. The packet also includes a packet closing flag which causes the packet handler to release the connection.

U.S. Pat. No. 4,703,487 to Haselton et al. for Burst-Switching Method for an Integrated Communications System issued Oct. 27, 1987 and U.S. Pat. No. 4,771,419 to Graves et al. for Method of and Switch for Switching Information issued Sep. 13, 1988. Both of these patents disclose switching networks for switching data wherein a header contains an address for making a connection and a termination character or characters for breaking the connection.

SUMMARY OF THE INVENTION

Disclosed is a mechanism for controlling the powering-on and powering-off of control units in a data processing system having a plurality of channels, a plurality of control units, and a communications network of links for interconnecting the channels to the control units. Each control unit includes a power-control table for recording power-control allegiance of the control unit to the channels. Where a control unit receives a power-on command from a channel, it records the identity of the channel in its power-control table. When a channel orders a control unit to power-off, the control unit checks to see if it owes power-control allegiance to the ordering channel. If it does, the control unit deletes the identity from its power-control table. The control unit will not power-off unless its power-control table is empty, indicating that it does not owe allegiance to any other channel.

It is thus a primary object of the present invention to provide a mechanism for controlling the powering-on and powering-off of control units by a channel.

It is another object of the present invention to provide a power-control mechanism which will not allow a channel to power-off a control unit if the control unit owes power-control allegiance to another channel.

It is another object of the present invention to provide a mechanism for multiple channels to control the powering-on and powering-off of a control unit.

It is another object of the present invention to provide for channels to control the powering-on and powering-off of control units remotely through a communication network.

The foregoing and other objects, features and advantages of the invention will be apparent from the following more particular description of the preferred embodiment of the invention as illustrated in the drawings.

DESCRIPTION OF THE PREFERRED EMBODIMENT

Figure 1:
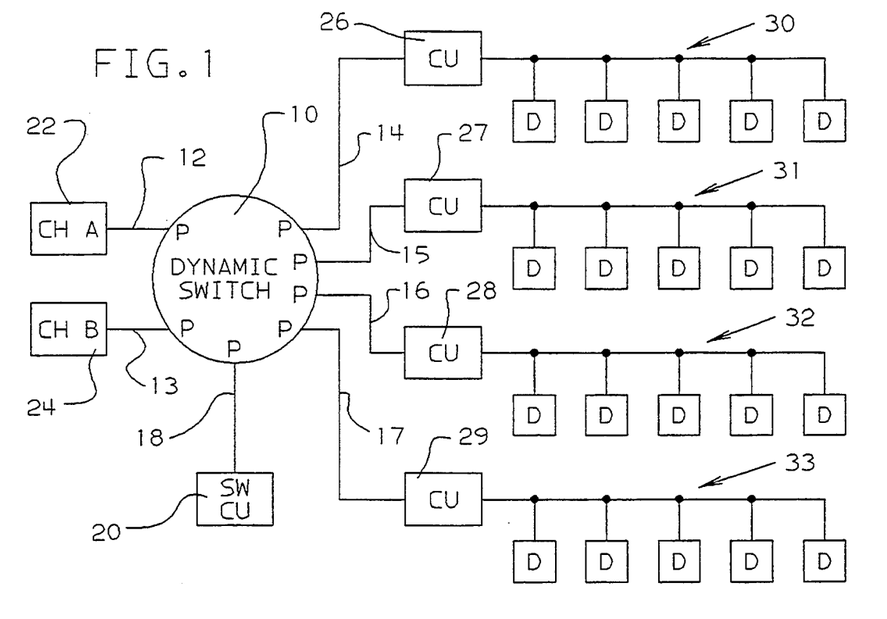
FIG. 1 is a diagram of a configuration of the I/O system of a data processing system usable with the present invention.

FIG. 1 is a block diagram of the I/O system of a data processing system for making dynamic connections between the channel subsystem of the data processing system and control units. The I/O system includes a dynamic switch 10 having a plurality of ports P, each port P connected to one end of one of a plurality of links 12–18, respectively. One of the links 18 is connected to a dynamic switch control unit 20, and each of the other links 12–17 is connected to either a channel, such as channel A designated 22 or channel B designated 24, or to one of the control units 26–29. Each of the control units 26–29 control a plurality 30–33 of peripheral devices D, respectively.

Each of the channels 22 and 24 is a single interface on a 370-XA or an ES/9000 channel subsystem. The channels 22 and 24 direct the transfer of information between I/O devices of the pluralities 30–33 of devices D and main storage (not shown) of the data processing system and provide the common controls for the attachment of different I/O devices D by means of a channel path (to be defined). The channels 22 and 24 are serial channels wherein data is transmitted and received in a serial format, as will be explained.

Each of the links 12–17 is a point-to-point pair of conductors that may physically interconnect a control unit and a channel, a channel and a dynamic switch (such as links 12 and 13), a control unit and a dynamic switch (such as links 14–17), or, in some cases, a dynamic switch and another dynamic switch. The two conductors of a link provide a simultaneous two-way communication path, one conductor for transmitting information and the other conductor for receiving information. When a link attaches to a channel or a control unit, it is said to be attached to the I/O interface of that channel or control unit. When a link is attached to a dynamic switch, it is said to be attached to a port P on that dynamic switch. When the dynamic switch makes a connection between two dynamic-switch ports, the link attached to one port is considered physically connected to the link attached to the other port, and the equivalent of one continuous link is produced for the duration of the connection.

The dynamic switch 10 provides the capability to physically interconnect any two links that are attached to it. The link attachment point on the dynamic switch 10 is the dynamic-switch port P. Only two dynamic-switch ports P may be interconnected in a single connection, but multiple physical connections may exist simultaneously within the same dynamic switch. The dynamic switch 10 may be constructed as disclosed in the aforementioned U.S. Pat. Nos. 4,605,928; 4,630,045; and 4,635,250, incorporated by reference herein. In one preferred embodiment, the dynamic switch 10 is a double sided switch, that is a two-sided cross-point switch, as described in the background of the aforementioned U.S. Pat. No. 4,635,250. The interconnection of two dynamic-switch ports P established by the dynamic switch 10 does not affect the existing interconnection of any other pair of dynamic-switch ports, nor does it affect the ability of the dynamic switch to remove those connections.

When a connection is established, two dynamic switch ports and their respective point-to-point links are interconnected by a switch matrix within the dynamic switch 10, as explained in the aforementioned switch patents, such that the two links are treated and appear as one continuous link for the duration of the connection. When frames are received by one of two connected switch ports P, the frames are normally passed from one port to the other for transmission on the other port's link.

The dynamic switch 10 can form a connection between two ports P in one of two ways: dynamic or static. The connection is termed a dynamic connection or static connection, accordingly.

The dynamic switch 10 can establish or remove a dynamic connection between two ports P based on the information provided by certain frame delimiters in the serial frames transmitted over the links and based on conditions present at each of these ports P as disclosed in co-pending U.S. patent application Ser. No. 07/429,267 to Brown et al. for "Switch and Its Protocol for Making Dynamic Connections, incorporated herein by reference.

The dynamic switch can establish or remove a static connection between two ports P as a result of commands received by means of the local or remote facilities of the dynamic-switch control unit 20. Frame delimiters or other sequences received at the port P have no effect on the static connection.

When a static connection exists between two ports P, the ports are in the static state. The static state is not affected by any information received from the link or from the statically connected port. If a sequence (to be explained) is received by one of two statically connected ports, the received sequence is normally retransmitted on the connected port's link. Frames may be received and transmitted simultaneously by statically connected ports.

In one embodiment, the dynamic switch 10 may have a maximum of 254 ports P. Since it takes two ports to make a connection, the maximum number of possible simultaneous connections is equal to half the number of ports P implemented. It will be understood that if the quantity of ports P is an odd number, then the maximum is half the maximum number of ports P less one. A port P does not have a link address and, therefore, is not uniquely addressable. However, an association between a port P and either a destination link address or a source link address is provided by the dynamic switch, as will be explained. The dynamic switch 10 has a matrix controller, discussed herein in connection with FIG. 6, which contains the information used to make and break connections between the ports P.

The dynamic switch 10 has one dynamic-switch control unit 20, which is assigned the unique link address of its link 18. The dynamic-switch control unit 20 is connected to the dynamic switch 10 as though it were attached to the dynamic switch by means of a port P and is available for dynamic connections like any other control unit attached to the dynamic switch 10. Through facilities provided by the dynamic-switch control unit 20, changes can be made to information in the matrix controller (to be explained) of the dynamic switch 10 concerning an individual port P which alters the ability of that port to be dynamically connected with another port.

Figure 2:
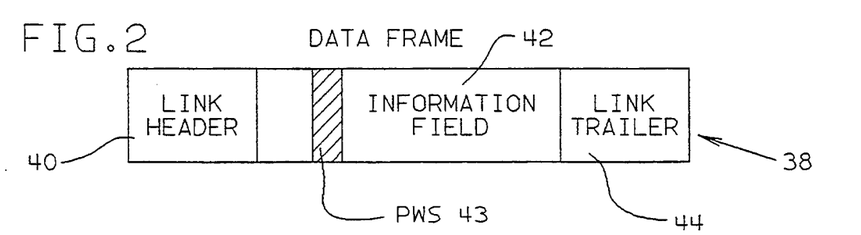
FIG. 2 is a diagram showing the fields of a data frame sent over the I/O system of FIG. 1.

As previously mentioned, information is transferred on the serial-I/O interface in a frame. A frame is a unit of information that is sent or received according to a prescribed format. This format delineates the start and end of the unit of information and prescribes the placement of the information within these boundaries. FIG. 2 shows the basic frame format 38 which consists of a fixed-length link-header field 40, a variable-length information field 42, and a fixed-length link-trailer field 44.

Communications using the switch are governed by two hierarchical levels of functions and serial-I/O protocols, the link level and the device level. Link level protocols are used whenever a frame is sent. These protocols determine the structure, size, and integrity of the frame. Link protocols also provide for making the connection through the dynamic switch 10 and for other control functions. Each channel and each control unit contains a link-level facility, which is the embodiment of the link protocols. The device level is used to convey application information such as the data which is transferred from an input/output device to the channel. A frame which contains application information or controls is called a device frame. A frame which is used solely for link level protocol is called a link-control frame.

Each link-level facility is assigned a unique address, called the link address. The assignment of a link address to a link-level facility occurs when the link-level facility performs initialization. Every frame sent through the switch contains link-level addressing which identifies the source and destination of the frame. Specifically, this addressing information consists of the link addresses of the sending link-level facility (source link address) and receiving link-level facility (destination link address). The switch uses this addressing information in order to make a connection from the port receiving the frame to the correct port for sending the frame to the specified destination.

The dynamic-switch control unit 20 has a link address assigned to it for the purpose of communicating with the channels and control units attached to the switch.

With the configuration of FIG. 1, contention created by two or more switch ports P receiving a frame requiring a dynamic connection to the same switch port P and its respective link is resolved by the facilities within the dynamic switch based on the conditions present. This contention is resolved, independent of whether a channel or control unit is attached to the link from each port involved. When the contention is resolved, only one of the contending ports becomes dynamically connected to the required port, while the other contending ports indicate on their respective links that a port-busy condition exists at the dynamic switch.

If the desired connection cannot be made, the dynamic switch 10 returns a link-control response frame containing a reason code giving the reason why the connection was not made. For example, when an error is detected in a frame that initiates a connection, a link-control-frame response (referred to herein as a response frame) called dynamic-switch-port-reject is sent including a reason code which indicates that a transmission error has occurred. Some responses are generated by the ports P, and some responses are generated by the matrix controller of the dynamic switch 10.

Figure 3:
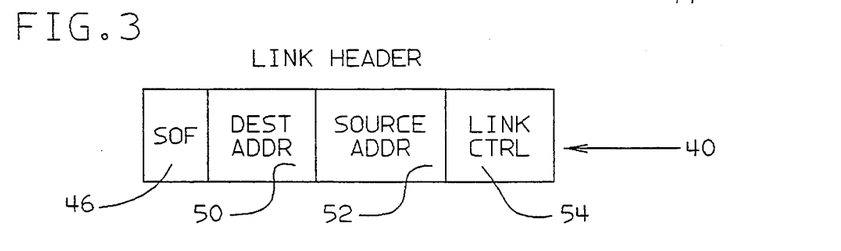
FIG. 3 is a diagram showing the link header of the data frame of FIG. 2.
Figure 4:
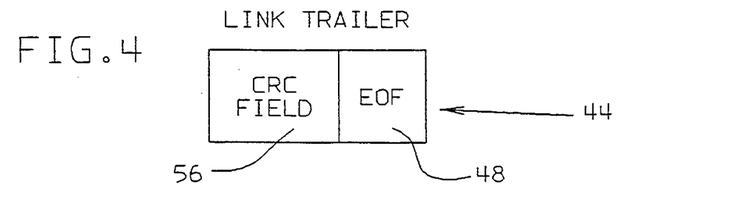
FIG. 4 is a diagram showing the link trailer of the data frame of FIG. 2.

FIG. 3 shows a link header 40, and FIG. 4 shows a link trailer 44. Every frame is bounded by a start-of-frame (SOF) delimiter 46 which is found in the link header 40, and an end-of-frame (EOF) delimiter 48, which is found in the link trailer 44. Frame delimiters 46 and 48 are composed of combinations of special transmission characters which do not have equivalent eight-bit data codes. In the preferred embodiment, the transmission codes used are those disclosed in U.S. Pat. No. 4,486,739 issued Dec. 4, 1984 to Franaszek et al. for Byte Oriented DC Balanced (0.4) 8B/10B Partitioned Block Transmission Code, assigned by the assignee of the present invention and incorporated herein by reference. The information contained between the frame delimiters 46 and 48 consist of data characters which have equivalent eight-bit codes as explained in the aforementioned Franaszek et al. patent.

In addition to the SOF 46, the link header 40 of FIG. 3 includes a destination-address field 50, a source-address field 52, and a link-control field 54.

As previously mentioned, the SOF 46 is a special string of transmission characters that cannot appear in the contents of an error-free frame. There are two types of SOF delimiters, the connect-SOF (CSOF) delimiter, which is used as an initiate connection control to initiate the making of a dynamic connection, and passive-SOF (PSOF) delimiter, which causes no action with respect to making a dynamic connection.

The destination-address field 50 is the first field of the contents of a frame and immediately follows the SOF delimiter 46. The destination-address field 50 identifies the link-level facility of a channel or control unit that is the destination for the frame, and is used to route the frame to the link-level facility that is the intended receiver. The destination link address 50 is used to determine which physical connection is to be made, and the destination to which the frame is to be routed through the dynamic switch 10. If no connection exists, that is, if the port P is in the inactive state, and no busy or dynamic-switch-port-reject conditions are present, the connection is made and the frame is routed to the destination port.

The source-address field 52 immediately follows the destination address field 50, and identifies the sending link-level facility.

A link-level facility provides its identity as the source of a frame by inserting its assigned link address in the source-address field 52 of any frame that it sends. After a frame is received with a valid source address 52, the source address 52 is used in most cases as the destination address in any subsequent response frame of future request frames to the same link-level facility.

The link-control field 54 indicates the type and format of the frame. The link-control field 54, which is the last field of the link header 40, immediately follows the source-address field 52. For the purposes of the present invention, the link-control field 54 indicates whether the frame is a link control frame or a device frame. The link-control field 54 may consist of or include a power control function in the form of an I bit, which will be explained. When the frame is a link control frame, the link-control field 54 also indicates the function of the frame. Some of these functions are dynamic-switch-port reject, link-level reject, link-level busy, dynamic-switch port busy, and other functions necessary to report the status for link level facilities.

The information field 42 is the first field following the link header 40. The size of the information field depends on the function performed by the particular frame. The aforementioned reason code, for instance, is transmitted in the information field 42 of response frames. The information field 42 may consist of or include a power status (PWS) field 43 for use in the power control (PWC) response frame of the present invention, as will be explained.

The link trailer 44 includes a cyclic-redundancy-check (CRC) field 56 just before the EOF delimiter 48. The CRC field 56 contains a redundancy-check code that is used by the receiving link-level facility to detect most frame errors which affect the bit integrity of a frame. The address 50 and 52, link-control 54 and information 42 fields are used to generate the CRC 56 and are, therefore, protected by the CRC 56.

The end-of-frame (EOF) delimiter 48 is the last string of transmission characters of a frame. Again, it is a specific train of transmission characters that cannot appear in the contents of an error-free frame. When the EOF delimiter 48 is encountered during the reception of a frame, it signals the end of the frame and identifies the two transmission characters immediately preceding the EOF delimiter 48 as the CRC 56 at the end of the contents of the frame. The EOF delimiter 48 also indicates the extent of the frame for purposes of any applicable frame-length checks.

There are two types of EOF delimiters 48, the disconnect-EOF (DEOF) delimiter, which is used to initiate the removal of a dynamic connection, and the passive-EOF (PEOF) delimiter, which causes no action with respect to removing a dynamic connection.

Idle characters are sent over the links when frames are not being transmitted. These idle characters, which are special characters not having data values, maintain the links in synchronism. Sequences of special idle characters are also transmitted to provide limited communication of special commands such as unconditional-disconnect and unconditional-disconnect response. These special sequences are not part of the present invention, and will not be discussed further.

Figures 5, 6:
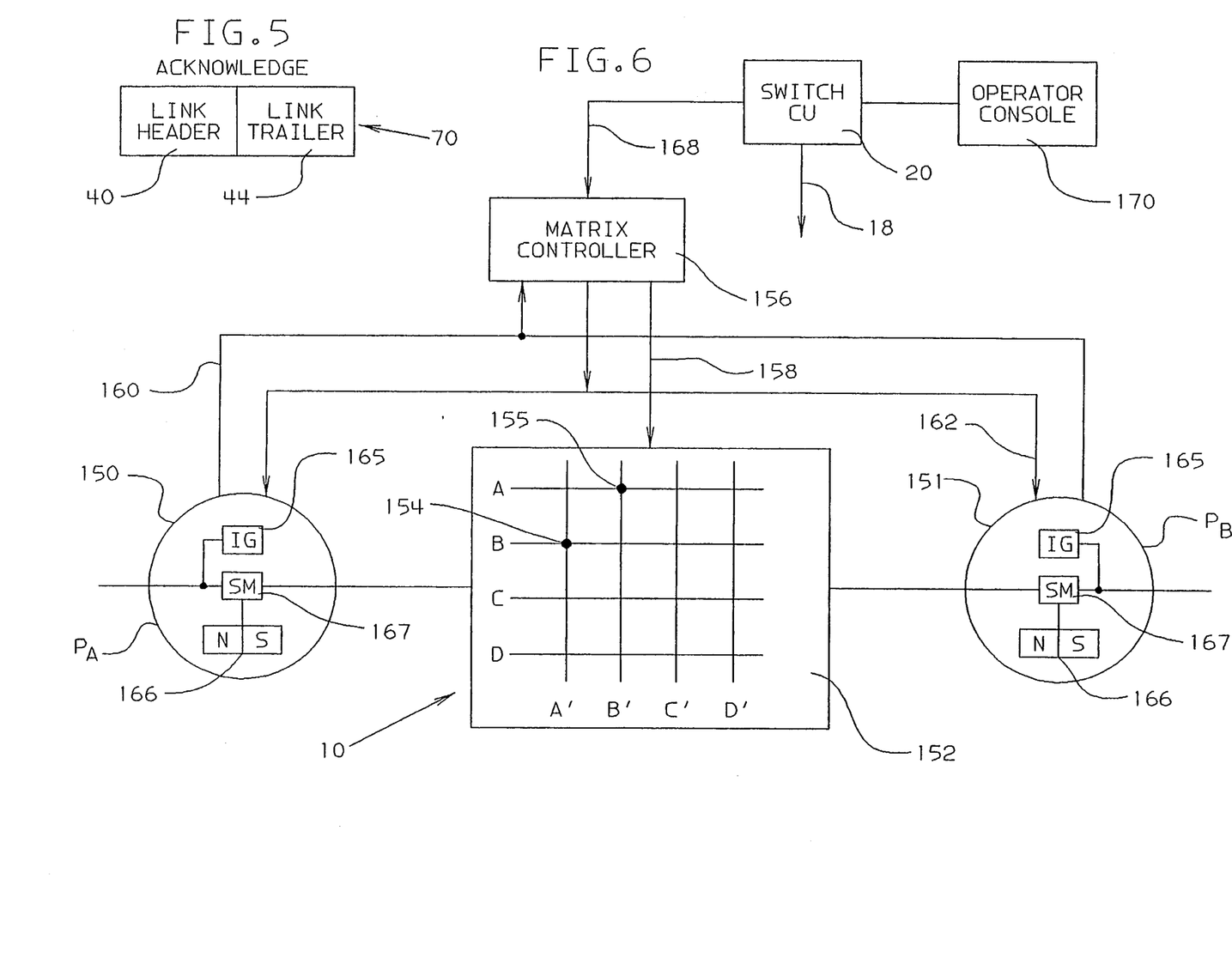
FIG. 5 is a diagram showing the fields of an acknowledge frame sent over the I/O system of FIG. 1.
FIG. 6 is a block diagram of a dynamic switch of the I/O system of FIG. 1.

FIG. 5 shows an acknowledge (ACK) frame 70 which is made up of the link header 40 and the link trailer 44 previously described. The ACK frame 70 does not include an information field and is used to acknowledge to a link-level facility that a previously sent frame was received safely. Since the ACK frame 70 includes a source address field 52, the link-level facility receiving the ACK frame 70 will know, upon receipt, who is acknowledging receipt of the previously sent out frame. This is important in those instances in which a link-level facility sends out a frame which is addressed to no one in particular by a to-whom-it-may-concern destination address, as will be discussed further. The to-whom-it-may-concern address may be designated by placing a special character in the destination address field 50 which is a unique, recognizable character different from a legitimate link address.

FIG. 6 is a block diagram of the dynamic switch 10 of FIG. 1, and includes only two dynamic-switch ports $P_A$ 150 and $P_B$ 151. The ports $P_A$ 150 and $P_B$ 151 are connected through a double sided matrix 152. The matrix 152 is made up of a plurality of parallel horizontal conductors A–D and a plurality of parallel vertical conductors A'–D'. Switches 154 and 155 at the cross-points of conductors A and B' and B and A', respectively, have been closed by initiate-connection controls to make the two way connection of the ports 150 and 151, as previously described. The actual connections of the matrix 152 is controlled by a matrix controller 156 over a matrix address output bus 158. The matrix controller 156 contains storage for storing the connections of the ports of the dynamic switch 10, the allowable connections which may be made, whether the connections are dynamic or static, and other information for the operation of the dynamic switch 10, as will be explained in connection with FIG. 1.

The matrix controller 156 is connected to the matrix 152 by the mentioned matrix address output bus 158, receives data from the ports 150 and 151 via a port input bus 160, and sends data to the ports 150 and 151 via a port output bus 162. Control signals over the bus 158 control the cross-point switches of the matrix 152, such as switches 154 and 155.

Information needed to request dynamic connections is sent by the ports P to the matrix controller via bus 160, and the matrix controller 156 responds to the ports P with information saying the requested connections are rejected or allowed, as applicable. Each port P contains storage 166 for storing a port number assigned to the port at initialization, and the port's status. Thus, the port can send a reject frame back to a requesting source if the port is busy, or if the port is not busy, inform the matrix controller 156 of a requested connection to see if the request is allowed. As will be explained, when a port P sends a request to the matrix controller 156, the port number from the storage 166 in the port P is included so that the matrix controller knows which port sent the request.

The dynamic switch control unit 20 is connected to the matrix controller 156 by a dynamic switch control unit input bus 168 for such purposes as making static connections in the matrix 152, blocking access to or fencing a port, and grouping ports together into partitions such that a port P may only be connected to another port in the same partition. An operator console 170 is part of the dynamic switch control unit 20 for inputting the mentioned information, or the information may be sent to the dynamic switch control unit 20 via the link 18, which is connected to one of the ports P of the dynamic switch 10, as discussed in connection with FIG. 1.

Each port may include an idle generator (IG) 165 which generates idle characters for transmission over the port's link, as previously described. The idle generator 165 may be constructed as described in the U.S. Pat. No. 5,048,062 for "Transmitting Commands Over a Serial Link", issued Sep. 10, 1991, and assigned to the assignee of the present invention, which application is herein incorporated by reference. It will be understood that idle characters for transmission over the ports' link may be passed through the matrix 152 from the dynamically connected port instead of coming from the idle generator 165.

Each port determines its own state based on the state in its storage 166 and the delimiters of frames from either its link or from its dynamically connected port by means of a state machine (SM) 167 which determines the state of its port. In the preferred embodiment, the state machine 167 may be implemented in hardware, or may be implemented by microprocessor executed microcode, if desired.

Figure 7A:
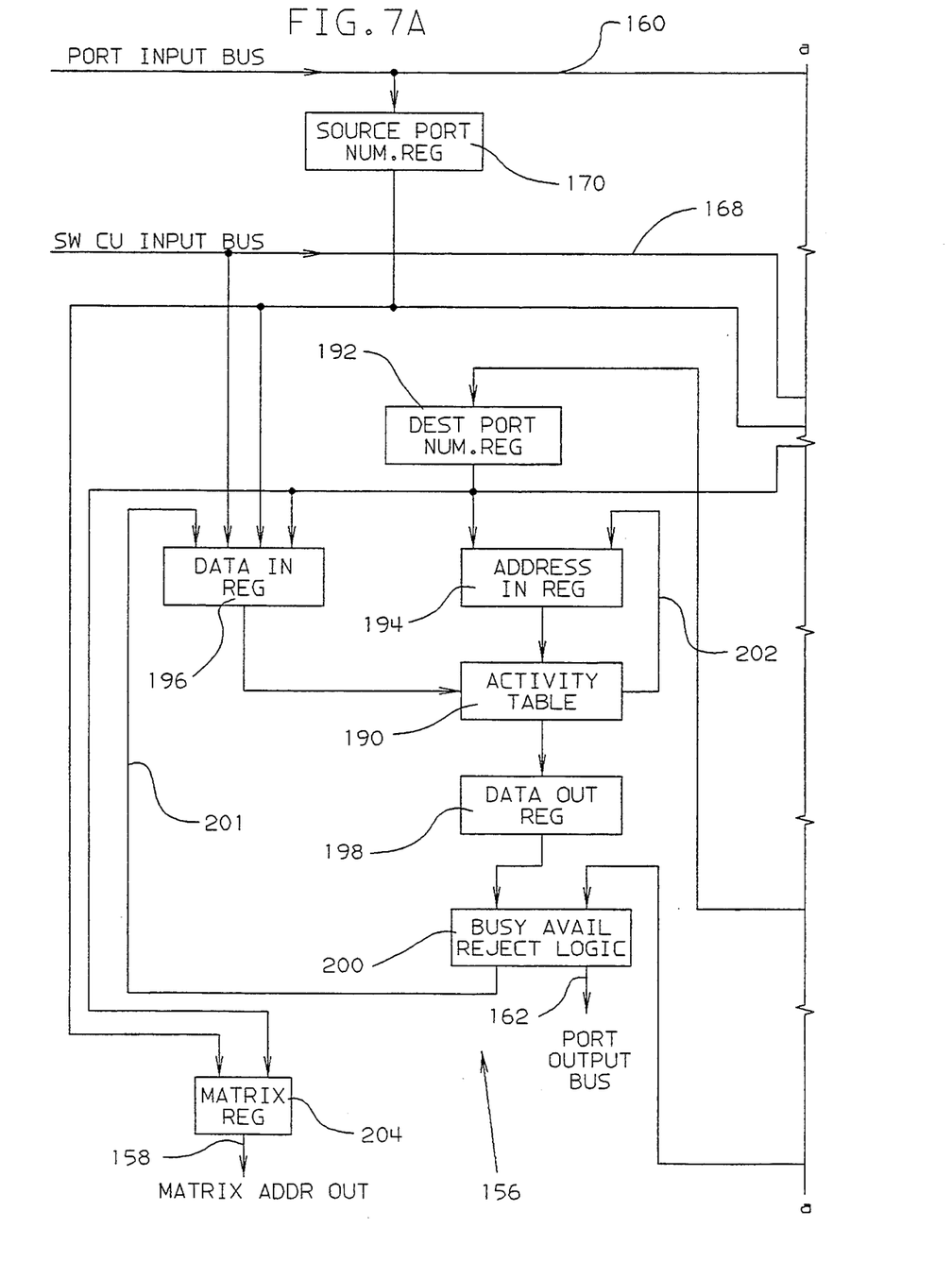
FIG. 7A and 7B, joined along a—a, form a block diagram of a matrix controller of the dynamic switch of FIG. 6.
Figure 7B:
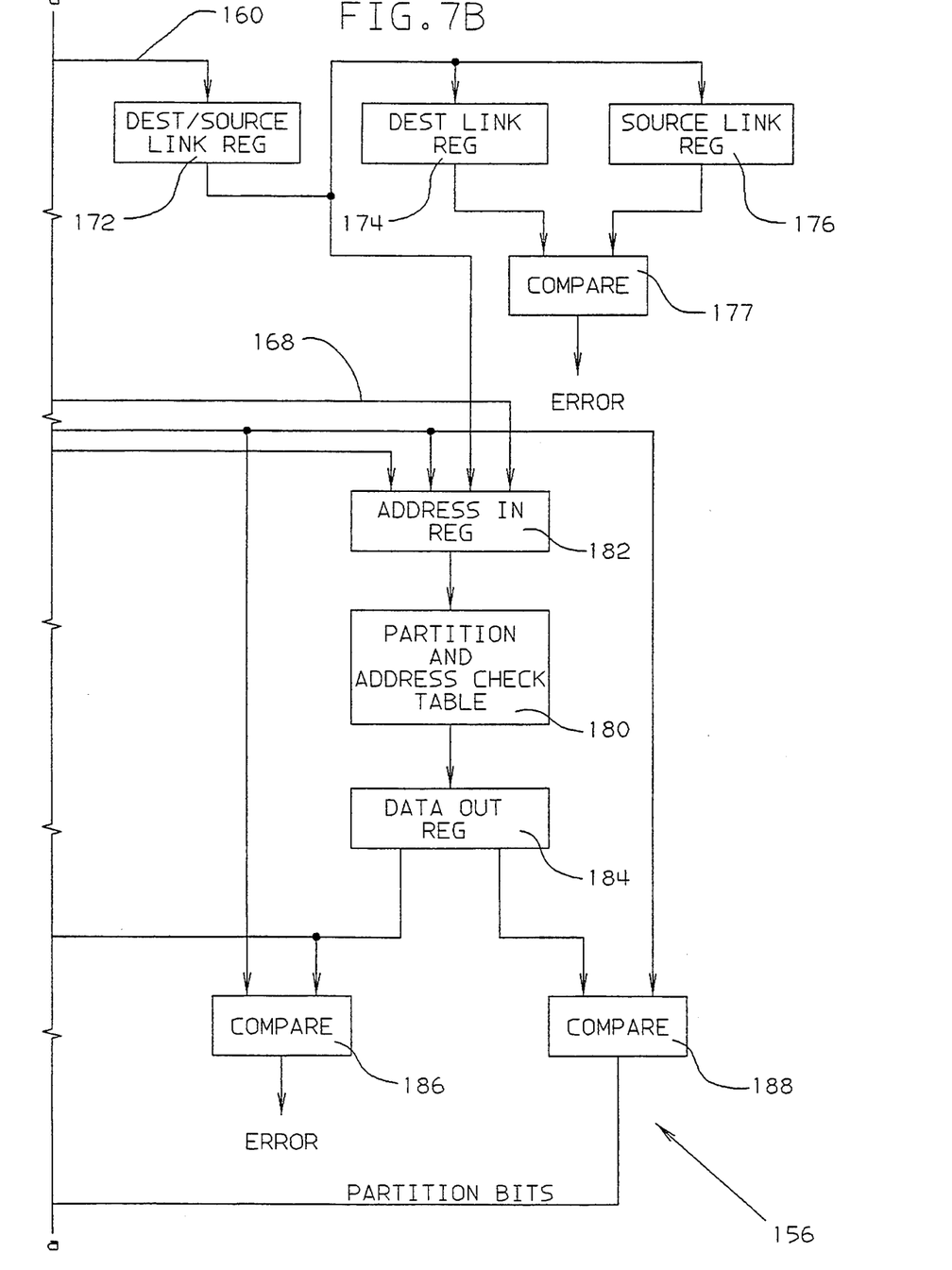

FIGS. 7A and 7B, joined along line a—a, form a block diagram of the matrix controller 156 of FIG. 6. The port input bus 160 is connected to a source port number register 170 for storing the source port number sent by the port P to the matrix controller 156. The port input bus 160 is also connected to a destination and source link register 172 for receiving and storing, in different bus cycles, the destination and source link addresses as received by the port P from fields 50 and 52 of the frame. The destination link address 50 is stored in the destination link register 174, and the source link address 52 is stored in the source link register 176, and the contents of these registers 174 and 176 are compared by a comparator 177. The comparator 177 generates an error interrupt if the destination link address is the same as the source link address.

A partition and address check table 180 provides a translation function for translating the destination and source link addresses to a port number used by the matrix controller to address the cross-point switches of the matrix 152. The partition and address check table also includes partition bits to indicate which partition, if any, the port is in. All link addresses which go into the partition and address check table 180 pass through the address in register 182, and the port data from the table 180 goes to the data-out register 184.

A comparator 186 is provided to insure that the source port number from the register 170 is the same as the port number translated by the partition and address check table 180 for the source link address from register 172. A comparator 188 is also provided to insure that the partition of the source port, which is a part of the source port number from the port input bus 160 to the register 170, is the same as the partition from the partition and address check table 180.

An activity table 190 is a content addressable storage device which contains the connections of the ports P of the dynamic switch 10, and an indication if the ports are busy, their status, if the ports are unavailable such as in port fencing, and if the connection of a port is static or dynamic. The entries in the activity table 190 contain the port number and connections bits which indicate the connection data. A destination port number register 192 is connected to the data out register 184 for receiving the destination port number from the partition and address check table 180, and provides the destination port number to an address in register 194 for the activity table 190. A data in register 196 receives the port number and connection bits for storage in the activity table 190, and a data out register 198 receives data from the activity table 198 and supplies the data to busy, available and reject logic 200 along with the results of the partition comparison of comparator 188. The busy, available and reject logic 200 provides a message over the port output bus 162 to the requesting port indicating if the requested connection is allowable, or if not, if the port to which connection is requested is busy, fenced and unavailable, in the wrong partition, one port of a static connection, or in the wrong state for the requested connection. If the connection is not allowed, the information supplied by the busy, available and reject logic 200 over bus 162 is used by the source port to return a suitable response frame to the source link with the proper reason code in the information field. Feedback paths 201 and 202 are provided allow the activity table 190 to be modified in a read, modify, write mode. If the connection is allowed, the matrix controller makes the requested connection, and the frame is transmitted from the source port to the now connected destination port for transmission over the destination port's link.

The address in register 182 is connected to the dynamic switch control unit input bus 168, the source port number register 170, the destination port number register 192, and the destination/source link register 172 such that the partition bits of the source and destination ports may be modified using the port number, and the destination and source link addresses may be translated to port numbers as described. The data in register 196 for the activity table 190 is connected to the dynamic switch control unit input bus 168, the source port number register 170, and the destination port number register 192 such that modifications to the connection data and inquiries regarding the connections to the ports may be made to the activity table 190.

The source port number register 170 and the destination port number register 192 are connected to a matrix register 204, which is connected to the matrix address output bus 158 for controlling the cross-point switches of the matrix 152 of FIG. 6 if the connections are to be made or broken by the matrix controller 156.

Figure 8:
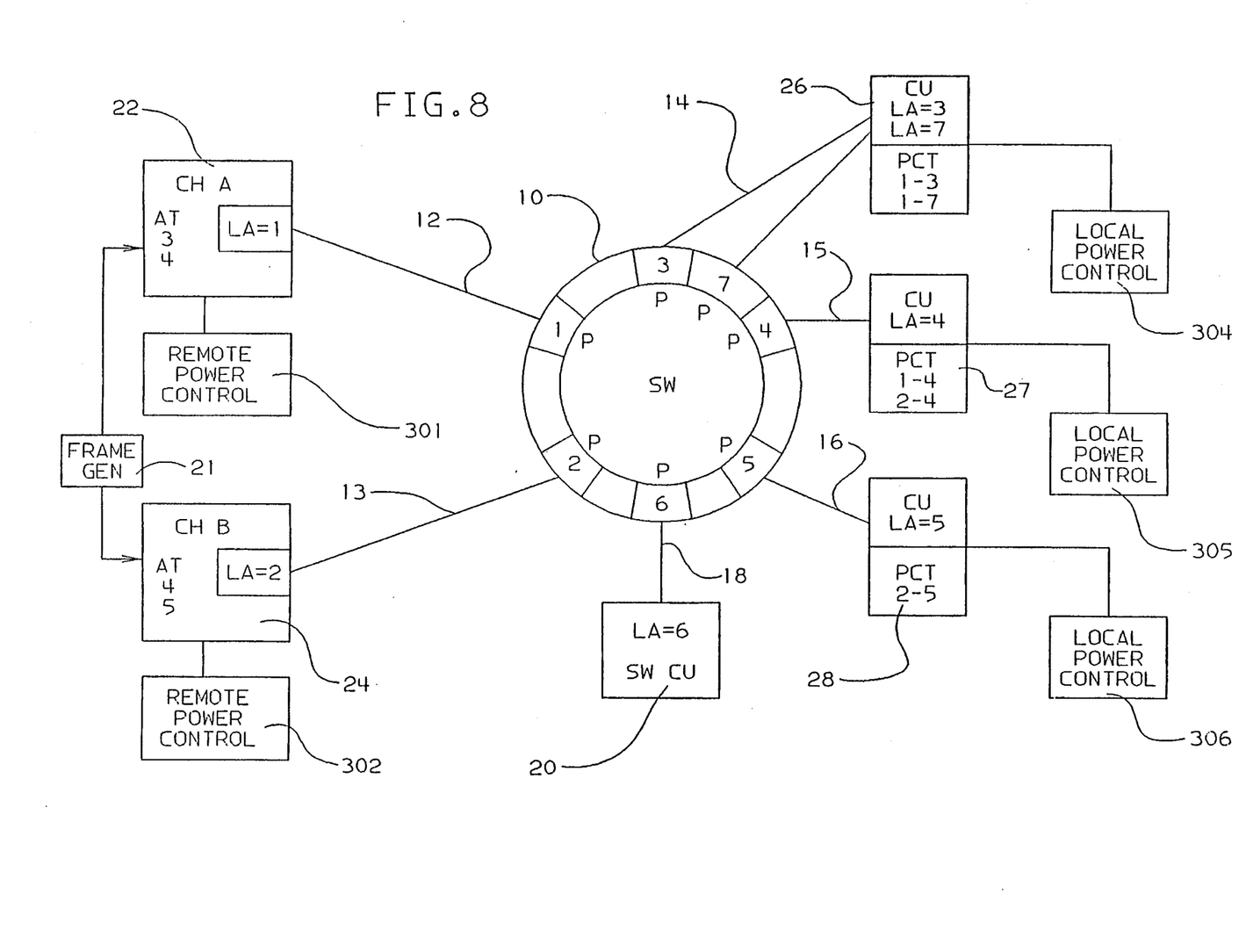
FIG. 8 is a diagram of a portion of the I/O system of FIG. 1 showing the association of channels and control units.

Turning now to FIG. 8, a portion of the I/O system of FIG. 1 is shown which illustrates how associations between channels and link-level facilities which are used for power control are established. As illustrated in FIG. 8, the channel 22 is given the link address of 1, and the channel 24 is given the link address 2. In the initialization process, link addresses 3 and 7, 4, 5 and 6 are assigned to control units 26, 27, 28 and dynamic switch control unit 20, respectively. As discussed earlier, the link addresses of the link-level facilities are associated with the ports to which the link-level facilities are attached. Thus, in FIG. 8, the associated link address is shown for each port P of the switch 10.

Each channel 22 and 24 has access to an association table (AT) in the data processing system which indicates facility-to-facility associations such as power allegiances. In the example of FIG. 8, channel 22 has an association table (AT) including entries 3 and 4 for logical paths to control unit 26, link address 3, and control unit 27, link address 4. Channel 24 has an AT table including 4 and 5 establishing power allegiances with control unit 27, link address 4, and control unit 28, link address 5.

The power-control (PWC) function of the present invention provides the capability of controlling the power of a control unit 26, 27 or 28 from a remote facility 301 or 302 associated with the channel 22 or 24, respectively. The control units 26, 27 and 28 may alternately be powered-up by local power controls 304, 305 and 306, respectively. It will thus be understood that each control unit 26,27 or 28 may be set to be under either local or remote power control.

The present invention may be used in a mixed environment, where not all control units implement the described PWC function.

It will be understood that each channel 22 and 24 of the I/O system of FIGS. 1 and 8 has access to or contains a frame generator 21 (see FIG. 8) or other command means to generate a frame as shown in FIGS. 2-4 to provide the PWC function of the present invention. Such a frame generator is shown and described in copending U.S. patent application Ser. No. 07/428,796 for "Apparatus for Constructing Data Frames for Transmission Over a Data Link" by Casper et al. and owned by the Assignee of the present invention and incorporated herein by reference. It will further be understood that each control unit 26-29 includes a receiver for receiving and analyzing the frames received, and a similar frame generator for generating response frames in response to frames received from a channel. FIGS. 9-12 illustrate the actions taken by a control unit in analyzing a power-control frame, as will be discussed, and are flow charts of a computer program for a microcode controlled microprocessor in each of the control units 26-29.

As will be explained, when a control unit is under remote power control, it will execute only remote commands received in a power-control frame. When the control unit is under local power control, it will execute only its own local power-on or power-off commands. However, even when it is under local power control, a control unit will add or delete entries to its association table responsive to power-on and power-off commands received in a power-control frame from a remote power control.

Three power-control operations are included in the power-control function: power on, power off, and power sense. PWC-request frames and PWC-response frames (which are special frames 38) are used to initiate power-control operations and to obtain the status of these operations, respectively. The protocols of the power-control operation determine whether the PWC frame is to be a request or a response. A PWC-request frame may be sent to a to-whom-it-may-concern destination address.

The link control field 54 of FIG. 3 contains a command field and an I bit which indicates whether the power-control (PWC) frame contains a command or status (as will be explained).

When the I bit is set to one, the command of the link-control field 54 indicates a command to be executed by the receiving control unit. When the I bit is set to zero, the PWC frame contains a power status (PWS) field 43 for reporting the status that resulted from the execution of the command indicated in the command of its link-control field 54. When a PWC-request frame containing a command is received and no link errors are detected, either the ACK frame 70 or a PWC-response frame containing status is returned. If an ACK frame 70 is returned by the control unit, then the control unit subsequently sends a PWC-request frame that contains the status which resulted from the execution of the command indicated in the command of its link-control field 54. When this PWC-request frame is received by the channel and no link errors are detected, an ACK frame 70 is returned by the channel. One power-control operation may result in several PWC-request frames from the control unit to the channel.

Each control unit 26, 27 and 28 that recognizes the command form of the PWC-request frame has a power-control table (PCT), (see FIG. 8). Each entry of the PCT represents a power-control allegiance that exists between the control unit and the channel identified by the link address in the PCT entry. A PCT entry consists of a source address and some form of control-unit identifier used to distinguish physical paths attached to the control unit. A control-unit identifier is a unique identifier associated with each physical path that attaches to the control unit. For instance, control unit 26 has a PCT having a first entry 1-3 showing that it has a power allegiance to channel 22 (link address 1) over the physical path represented by link address (LA) 3, and a second entry 1-7 showing that it has a second power allegiance to channel 22 over the physical path represented by link address 7. It will be understood that more than one link may connect the dynamic switch 10 with a control unit, and each link will be associated with its own port P and be given its own link address. An entry is made in the PCT each time a PWC-request frame containing the command form of the power-on operation (to be explained) is accepted and the combination of the source address from the frame and the control-unit identifier does not exist in the PCT. During normal operation of the control unit, an entry is removed from the PCT each time a power-off operation is performed and the combination of the source address from the frame and the control-unit identifier exists in the PCT. Entries are made and removed from the PCT independent of whether the control unit is under local or remote power control.

The power-control operations of the PWC function are power off, power on and power sense. These power-control operations are defined as follows:

POWER OFF: The command form of power-off is sent to cause a control unit to power down. The combination of the source address of the frame and the control-unit identifier is used as a tag to match this power-off operation with a previous power-on operation. Provided that the receiver is under remote power control, power is turned off after a power-off operation is accepted from each and every source to which a power allegiance exists. Power-off status is sent by means of a PWC-response frame to inform the channel of the results of executing the power-off operation. Power-off removes the associated entry from the PCT. When the PCT becomes empty, the power is turned off.

POWER ON: The command form of the power-on operation is sent to cause a control unit and its attached devices to power up. The combination of the source address of the frame and the control-unit identifier is used as a tag to match this power-on operation with a subsequent power-off operation. Provided that the control unit is under remote power control, power is turned on whenever the control unit makes the transition from having no power-control allegiance to having a power-control allegiance. Power-on status is sent to inform the channel of the results of executing the power-on operation. Several PWC-request frames may be generated as a result of a single power-on operation.

POWER SENSE: The command form of power sense is sent to cause a control unit to return power-control status. Power-sense status is sent to inform the channel of the state of the control unit regarding power control.

The frame specifying the PWC function has an information field which may include or consist of a PWS field 43 that contains the power status of the sender of the frame, provided that the I bit is set to zero. If the I bit is one, the PWS field 43 must be zero; otherwise, the frame is discarded and an error is detected. The PWS field 43 includes the following status bits:

NO POWER ALLEGIANCE (NA): When the NA bit is set to one, no power-control allegiance existed between the control unit and channel (as indicated when there is no match between an entry in the PCT and the combination of the source address and the control-unit identifier) when the power-control command was received. This bit, when set to zero, indicates that there was a power-control allegiance that existed between the control unit and channel (as indicated when the combination of the source address and the control-unit identifier is matched with any entry in the PCT) when the power-control command was received.

TABLE FULL (TF): When the TF bit is set to one, the control unit is unable to perform the requested power-control operation because all the facilities required to maintain power-control allegiances are currently in use.

POWER CHECK (CK): When the CK bit is set to one, a power fault has been detected.

LOGIC COMPLETE (LC): When the LC bit is set to one, the sequencing of power to the logic and device is complete. This bit is set to one as long as the control unit is in the all-power-on state, as will be explained.

SURGE COMPLETE (SC): When the SC bit is set to one, the start-up power-surge portion of powering on is complete. This bit must be set to one when the LC bit is set to one.

REMOTE SOURCE (RS): When the RS bit is set to one, the control unit is under remote power control. This bit, when set to zero, indicates that the control unit is under local power control.

As previously mentioned, a control unit may be under either remote power control or local power control. In addition, each control unit and its associated devices may be in one of three power states when a PWC-request frame is received: 1) all-power-on, 2) power-off-in-standby, or 3) all-power-off.

When a control unit is in the all-power-on state, the control unit and its associated devices are fully powered on and are considered capable of performing all link-control functions.

When the control unit is in the power-off-in-standby state, the control unit is powered down, but it can still perform a limited subset of functions; that is, it can perform the procedures necessary to start initialization.

When the control unit is in the all-power-off state, the control unit and its associated devices are fully powered down. The control unit is not capable of performing any function, and operator intervention is necessary before the control unit can get out of this state.

Figure 9:
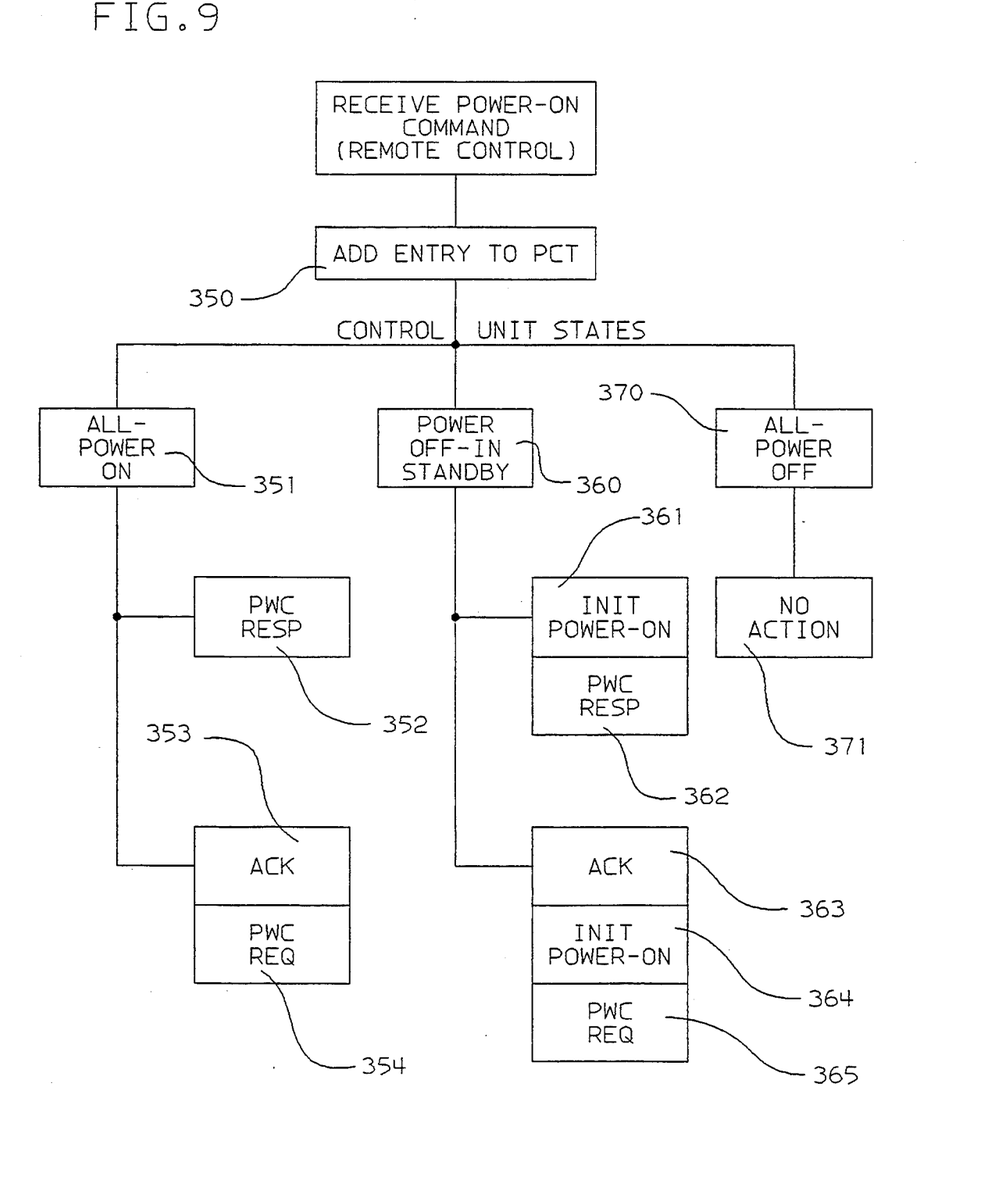
FIG. 9 is a flow diagram for the receipt by a control unit under remote control of a power-on command.

The power-on and power-off power-control operations of the PWC function are as follows:

POWER ON: As shown in FIG. 9, when the control unit is under remote power control and a PWC-request frame containing the command form of the power-on operation is received, an entry that consists of the source address from the frame and the control-unit identifier is made in the power-control table (350), provided that an entry does not already exist and provided that there is room in the table, and one of the following responses occurs, depending on the power state, as follows:

1. The control unit is fully powered on (351).
    Either a PWC-response frame containing the status form of the power-on operation (352) or an ACK frame (353) is generated. If a PWC-response frame containing the status form of the power-on operation is generated, it indicates a) remote power control, b) surge complete, and c) logic complete. If an ACK frame is generated at 353, the control unit subsequently presents the PWC-request frame (354) containing the status form of the power-on operation. The status indicated is as described above.

2. The control unit is powered off in standby (360).
    Either the sequence of powering on the control unit is initiated (361) and a PWC-response frame containing the status form of the power-on operation is generated (362), indicating remote power control and at least surge complete, or an ACK frame is generated (363). When an ACK frame precedes the initiation of the sequence for powering on the control unit (364), the control unit subsequently presents one or more PWC-request frames (365) that contain the status form of the power-on operation; the status indicates remote power control with 1) surge complete alone or 2) surge complete and logic complete. Logic complete, if not presented with surge complete, is presented later, when the control unit is fully powered up.
    While the control unit is in the process of sequencing the power on, it is possible to receive frames from any of the links attached to the control unit. At a minimum, the control unit generates a response-frame having a busy or an appropriate reject reason code.

3. The control unit has all power off (370).
    The PWC-request frame is not sent (371) because the link over which the frame is to be sent has not achieved sync, or if a dynamic switch exists, the sender of the PWC-request frame receives a response-frame having a port-malfunction reason code.

Figure 10:
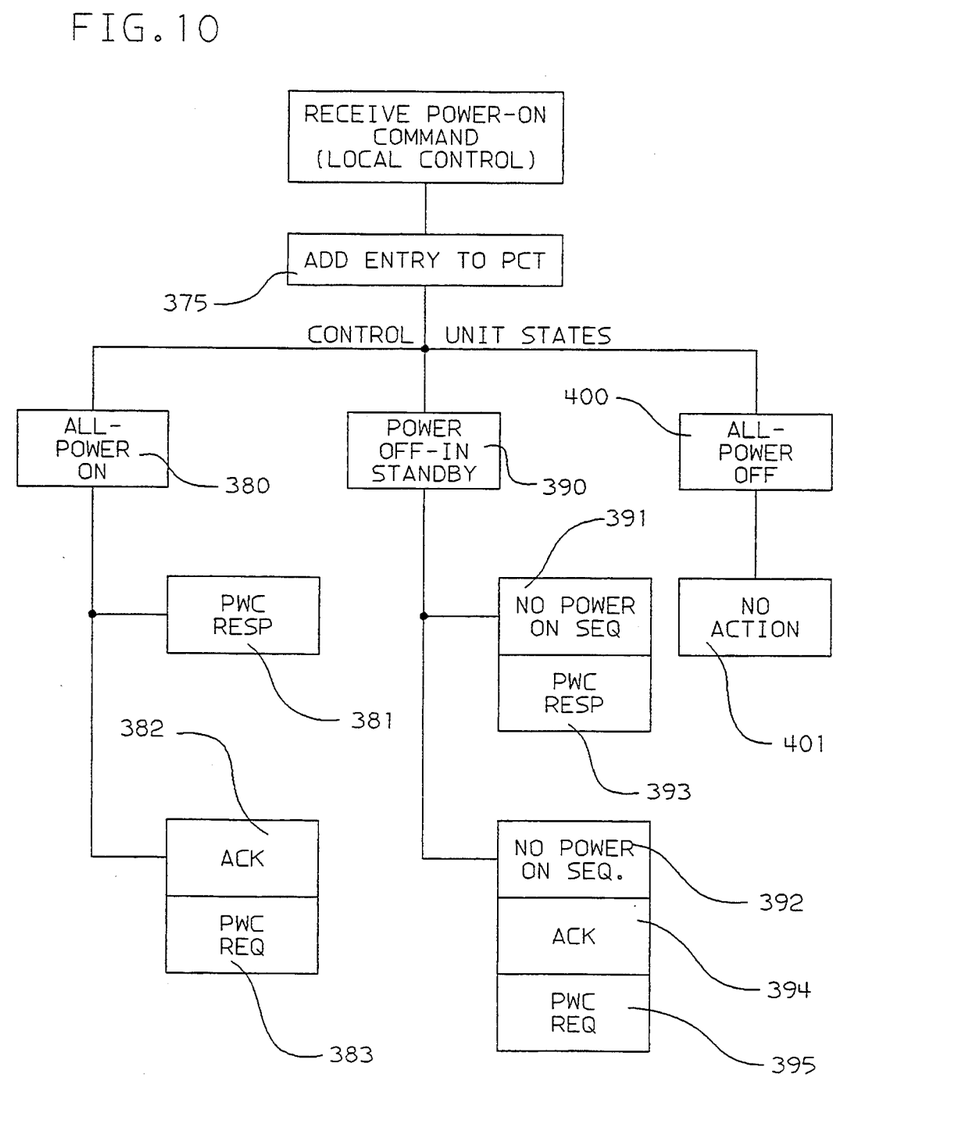
FIG. 10 is a flow diagram for the receipt by a control unit under local control of a power-on command.

As shown in FIG. 10, when the control unit is under local power control and a PWC-request frame containing the command form of the power-on operation is received, an entry that consists of the source address from the frame and the control-unit identifier is made in the PCT (375), provided that an entry does not already exist and provided that there is room in the table, and one of the following responses occurs, depending on the power state:

1. The control unit is fully powered on (380).
    Either a PWC-response frame containing the status form of the power-on operation (381) or an ACK frame (382) is generated. If a PWC-response frame containing the status form of the operation is generated at 381, it indicates a) local power control, b) surge complete, and c) logic complete. If an ACK frame is generated at 382, the control unit subsequently presents a PWC-request frame containing the status form of the power-on operations (383). The status indicated is as described above.

2. The control unit is powered off in standby (390).
    No power-on sequencing is initiated (391, 392), and either a PWC-response frame containing the status form of the power-on operation (393) or an ACK frame (394) is generated. If a PWC-response frame containing the status form of the operation is generated at 393, it indicates local power control. If an ACK frame is generated at 394, the control unit subsequently presents a PWC-request frame (395) containing the status form of the power-on operation that indicates local power control.

3. The control unit has all power off (400).

The PWC-request frame is not sent (401) because the link over which the frame is to be sent has not achieved sync, or if a dynamic switch exists, the sender of the PWC-request frame receives a link reject indicating that the port is not available.

During the procedures for initialization, the procedure for powering on a particular control unit is considered to be complete when any of the following occurs:

1. A PWC frame is received containing the status form of the power-on operation, and the status indicates logic complete.
2. A PWC frame is received containing the status form of the power-on, and the status indicates local power control.
3. A PWC frame is received containing the status form of the power-on operation, and the status indicates table full.
4. The PWC-request frame containing the command form of the power-on operation receives a response-frame having a link-protocol error reason code.

During the procedures for initialization, if the initialization of multiple control units is proceeding in parallel, the channel can proceed with the power portion of initialization for the next control unit when any of the following occurs:

1. A PWC frame is received containing the status form of the power-on operation, and the status indicates surge complete or local power control.
2. The PWC-request frame containing the command form of the power-on operation receives a response-frame having a link-protocol error reason code.
3. A PWC frame is received containing the status form of the power-on operation, and the status indicates table full or power check.

Figure 11:
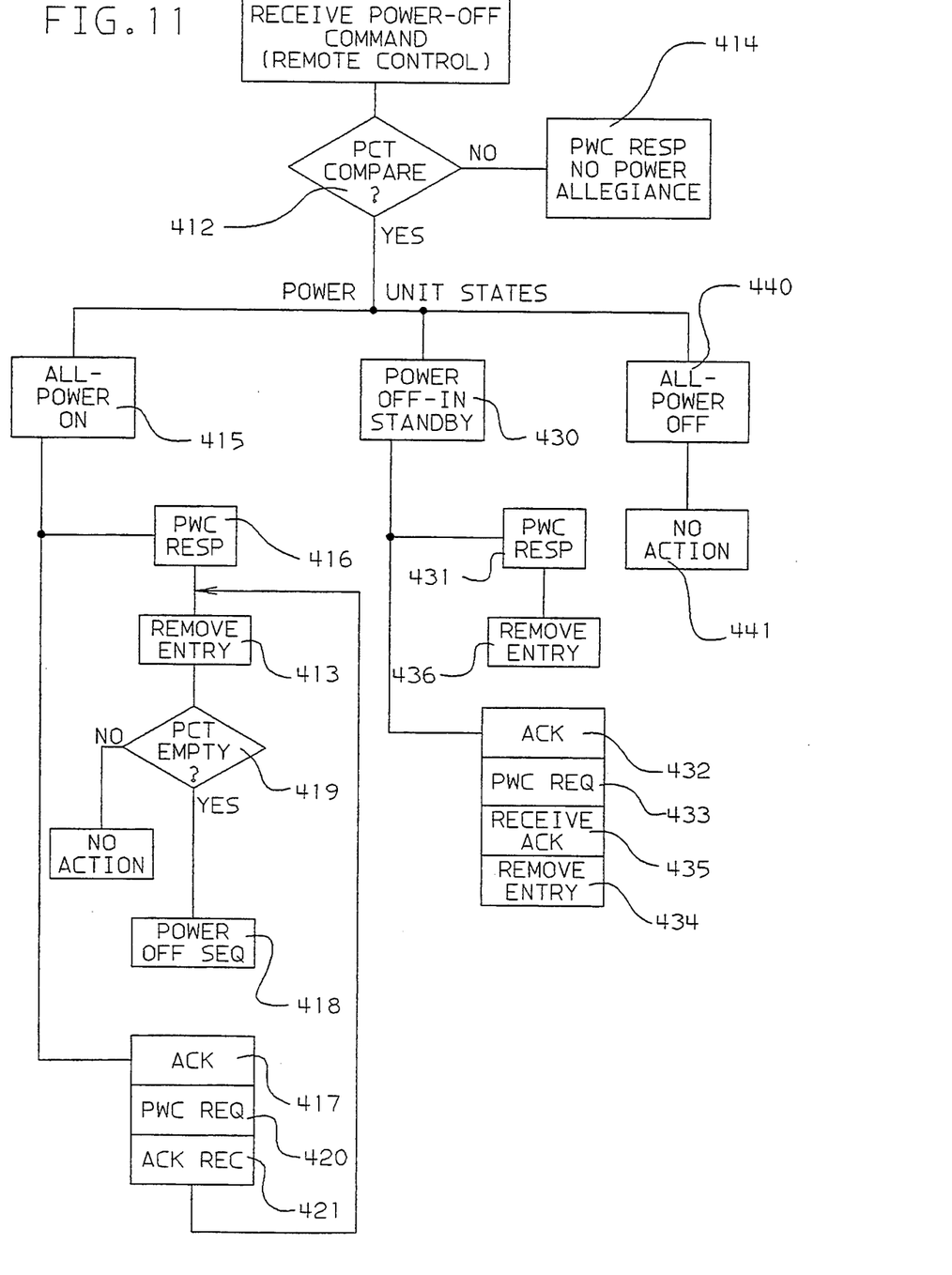
FIG. 11 is a flow diagram for the receipt by a control unit under remote control of a power-off command.

POWER OFF: As shown in FIG. 11, when the control unit is under remote power control and a PWC-request frame containing the command form of the power-off operation is received, the value formed by the combination of the source address from the frame and the control-unit identifier is compared with the entries in the PCT (412). If there is not an equal compare, a PWC-response frame containing the status form of the power-off operation is generated and the status includes the no-power-allegiance indication (414). If there is an equal compare, one of the following responses occurs, depending on the power state:

1. The control unit is fully powered on (415).

Either a PWC-response frame containing the status form of the power-off operation (416) or an ACK frame (417) is generated. If a PWC-response frame containing the status form of the power-off operation is generated (416), it indicates a) remote power control, b) surge complete, and c) logic complete, followed by the removal of the entry from the power-control table (413) and the initiation of the power-off sequence (418), provided there are no further power-control allegiances, that is, the PCT is empty, (419). If an ACK frame is generated (417), the control unit subsequently presents the PWC-request frame containing the status form of the power-off operation (420). The status indicted is as described above. The entry is removed from the PCT at 413 when the ACK frame is received (421). The entry removal at 413 is followed by the initiation of the power-off sequence (418), provided that there are no further power-control allegiances, that is, the PCT is empty at 419.

2. The control unit is powered off in standby (430).

Either a PWC-response frame containing the status form of the power-off operation is generated (431), or an ACK frame is generated (432). If a PWC-response frame containing the status form of the power-off operation is generated at 431, the status indicates remote power control. The entry is then removed from the power-control table (436). If an ACK frame is generated (432), the control unit subsequently presents the PWC-request frame (433) containing the status form of the power-off operation that indicates remote power control. The entry is removed from the power-control table (434) after the ACK frame is received (435).

3. The control unit has all power off (440).

The PWC-request frame is not sent (441) because the link over which the frame is to be sent has not achieved sync, or if a dynamic switch exists, the sender of the PWC-request frame receives a response-frame having the port is not available reason code.

Figure 12:
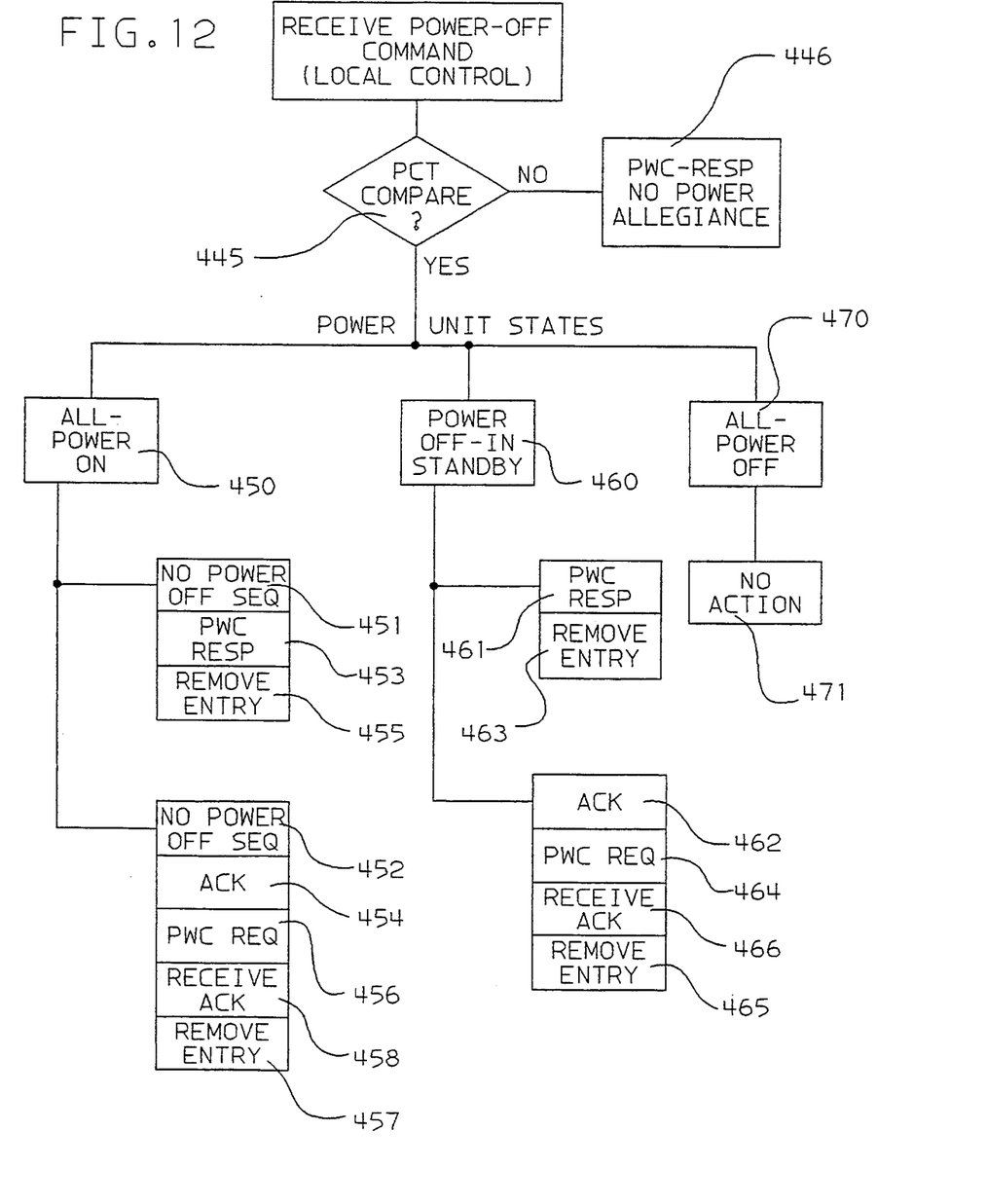
FIG. 12 is a flow diagram for the receipt by a control unit under local control of a power-off command.

As shown in FIG. 12, when the control unit is under local power control and a PWC-request frame containing the command form of the power-off operation is received the value formed by the combination of the source address from the frame and the control-unit identifier is compared with the entries in the PCT (445). If there is not an equal compare, a PWC-response frame containing the status form of the power-off operation is generated and the status includes the no-power-allegiance indication (446). If there is an equal compare, one of the following responses occurs, depending on the power state:

1. The control unit is fully powered on (450).

No power-off sequencing is initiated (451, 452), and either a PWC-response frame containing the status form of the power-off operation (453) or an ACK frame (454) is generated. If a PWC-response frame containing the status form of the power-off operation is generated at 453, it indicates a) local power control, b) surge complete, and c) logic complete, and then the entry is removed from the PCT (455). If an ACK frame is generated at 454, the control unit subsequently presents the PWC-request frame containing the status form of the power-off operation (456). The status indicated is as described above. The entry is removed from the power-control table (457) when the ACK frame is received (458).

2. The control unit is powered off in standby (460).

Either a PWC-response frame containing the status form of the power-off operation is generated (461), or an ACK frame (462) is generated. If a PWC-response frame containing the status form of the power-off operation is generated at 461, it indicates local power control and then the entry is removed from the PCT (463). If an ACK frame is generated (462), the control unit subsequently presents the PWC-request frame containing the status form of the power-off operation (464). The status indicated is as described above. The entry is removed from the PCT (465) when the ACK frame is received (466).

3. The control unit has all power off (470).

The PWC-request frame is not sent (471) because the link over which the frame is to be sent has not achieved sync, or if a dynamic switch exists, the sender of the PWC-request frame receives a response-frame having the port-is-not-available reason code.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described our invention, what we claim as new, and desire to secure by Letters Patents is:

1. In a data processing system having a plurality of channel interfaces for transmitting data bi-directionally between a plurality of input/output control units and said data processing system, a communications network including a switch for interconnecting each channel interface to at least one of said plurality of said input-/output control units, said data network including first links with first link identifiers for connecting respectively said plurality of channel interfaces to said switch and second links with second link identifiers for respectively connecting said switch to said plurality of input-/output control units, and a switch control unit controlling said switch to selectively connect said first links with said second links, a system to power-on and power-off said each of said plurality of input/output control units, comprising in combination:
   a channel interface association table for said each of said plurality of channel interfaces, an entry in said channel interface association table indicating a power allegiance between a channel interface and one of said plurality of input/output control units, said entry identifying said one of said plurality of input/output control units by a second link identifier;
   a remote power control means coupled to said each of said plurality of channel interfaces, said remote power control means issuing power commands to control the power-on and power-off of said input-/output control units;
   a data frame generator coupled to said channel interfaces to generate data frames, in response to said power commands, for transmission over said communications network to one of said input/output control units, said data frame including a field identifying said channel interface as a source of a power command and identifying an input/output control unit as a recipient of said power command, said field comprised of values identifying said respective first and second links in the switch controlled transmission path between a channel interface source and an input/output control unit recipient;
   each of said plurality of input/output control units including a control unit association table and means to compare an entry in said control unit association table with said field in said data frame;
   said each of said plurality of input/output control units recording in its control unit association table, in response to a power-on command, an entry identifying the source of said power-on command;
   said each of said plurality of input/output control units comparing said field in a received power-off command with said association table and deleting an entry in said association table with a source identifier corresponding to a source identifier of the received power-off command; and
   said each of said plurality of input/output power control units including power-control executing units for executing said power-off command.

2. In a data processing system having a plurality of channel interfaces for transmitting data bi-directionally between a plurality of input/output control units and said data processing system, a communications network including a switch for interconnecting each channel interface to at least one of said plurality of said input-/output control units, a system to power-on and power-off said each of said plurality of input/output control units, comprising in combination:
   a channel interface association table for said each of said plurality of channel interfaces, an entry in said channel interface association table indicating a power allegiance between a channel interface and one of said plurality of input/output control units;
   a remote power control means coupled to said each of said plurality of channel interfaces, said remote power control means issuing power commands to control the power-on and power-off of said input-/output control units;
   a data frame generator coupled to said channel interfaces to generate data frames, in response to said power commands, for transmission over said communications network to one of said input/output control units, said data frame including a field identifying said channel interface as a source of a power command and identifying an input/output control unit as a recipient of said power command;
   each of said plurality of input/output control units including a control unit association table and means to compare an entry in said control unit association table with said field in said data frame;
   said each of said plurality of input/output control units recording in its control unit association table, in response to a power-on command, an entry identifying the source of said power-on command;
   said each of said plurality of input/output control units comparing said field in a received power-off command with said association table and deleting an entry in said association table with a source identifier corresponding to a source identifier of the received power-off command; and
   said each of said plurality of input/output power control units including power-control executing units for executing said power-off command.

3. The power-function apparatus defined in claim 2 further comprising:
   power-control means for setting whether said power-control executing means is under local or remote control; and
   local command means connected to said one control unit for issuing local power-control commands to said power-control executing means for being executed by said power-control executing means when said power-control executing means is under local control.

4. The power function apparatus defined in claim 3 wherein said remote power-control commands include power-on, power-off and power sense commands, and said power-control executing means includes entry removal means for removing the matching entry from control unit association table means as determined by said comparison means upon receipt of a remote power-off command when said power-control executing is under either local or remote control.

5. The power-function apparatus defined in claim 4 wherein said power-control executing means includes power-off means to power off said one control unit if a remote power-off command is received, the removal of said matching entry by entry removal means results in said control unit association table being empty, and said power-control executing means is under remote control.

6. The power-function apparatus defined in claim 3 wherein said power-control executing means includes entry adding means for adding an entry to control unit association table upon receipt of a remote power-on command when said power-control executing means is under either of said local or remote control.

7. The power-function apparatus defined in claim 6 wherein said power-control executing means includes power-on means to power on said one control unit if a remote power-on command is received, and said power-control executing means is under remote control.

8. The power-function apparatus defined in claim 7 further comprising a PWC-response means in said power-control executing means for sending a PWC-response frame over said communications network from said one control unit to said specified channel, said PWC-response frame including status information for reporting the results of said remote power-control command on said one control unit.

9. The power-function apparatus defined in claim 8 wherein said status information in said PWC-response frame includes means for reporting surge complete status.

10. The power-function apparatus defined in claim 8 wherein said status information in said PWC-response frame includes means for reporting logic complete status.

11. The power-function apparatus defined in claim 6 further comprising acknowledge means in said power-control executing means for sending an acknowledge frame over said communications network from said one control unit to said specified channel, said acknowledge frame for indicating to said specified channel that a remote power-control command was received from said specified channel.

* * * * *